United States Patent [19]
Matsuoka

[11] Patent Number: 5,765,661
[45] Date of Patent: Jun. 16, 1998

[54] ELECTRIC POWER STEERING APPARATUS

[75] Inventor: Hirofumi Matsuoka, Souraku-gun, Japan

[73] Assignee: Koyo Seiko Co., Ltd., Osaka, Japan

[21] Appl. No.: 561,351

[22] Filed: Nov. 21, 1995

[30] Foreign Application Priority Data

Nov. 21, 1994 [JP] Japan .................... 6-286779

[51] Int. Cl.$^6$ ........................................ B62D 5/04
[52] U.S. Cl. ........................ 180/446; 701/41
[58] Field of Search ................... 180/400, 404, 180/421, 422, 423, 443, 444, 445, 446; 701/41, 42, 43, 44

[56] References Cited

U.S. PATENT DOCUMENTS

| | | |
|---|---|---|
| 4,621,327 | 11/1986 | Dolph et al. . |
| 4,660,671 | 4/1987 | Behr et al. ............... 180/443 |
| 4,869,334 | 9/1989 | Marumoto et al. . |
| 4,959,787 | 9/1990 | Morishita et al. .......... 180/443 |
| 5,253,725 | 10/1993 | Nishimoto ............... 180/443 |
| 5,271,474 | 12/1993 | Nishimoto ............... 180/443 |
| 5,355,315 | 10/1994 | Daido et al. ............. 180/446 |
| 5,361,210 | 11/1994 | Fu ........................ 180/443 |
| 5,480,000 | 1/1996 | Daido et al. ............. 180/446 |

FOREIGN PATENT DOCUMENTS

| | | |
|---|---|---|
| 0 535 422 A1 | 4/1993 | Japan . |
| 0 536 590 A2 | 4/1993 | Japan . |
| 0 554 703 A1 | 8/1993 | Japan . |
| 0 572 961 A2 | 12/1993 | Japan . |

*Primary Examiner*—Brian L. Johnson
*Assistant Examiner*—Gary Savitt
*Attorney, Agent, or Firm*—Helfgott & Karas, P.C.

[57] ABSTRACT

In an electric power steering apparatus, a control unit is divided into two units. A first control unit which determines a first motor current target value is constructed only by hardware. A second control unit includes a fail-safe unit not required to respond quickly. The second control unit determines a second motor current target value, and outputs, to the first control unit, a signal for changing the first motor current target value on the basis of the first motor current target value, the second motor current target value, a driving current, and a signal indicative of a condition of a vehicle. By sharing of roles in this way, it is possible to enhance the responsivity of the apparatus to a steering operation and to realize the reduction in production costs.

12 Claims, 15 Drawing Sheets

ELECTRIC POWER STEERING APPARATUS

BACKGROUND OF THE INVENTION

1. Field of the Invention

The invention relates to an electric power steering apparatus which controls the driving of a steering force assisting motor on the basis of a motor current target value of the steering force assisting motor which is determined on the basis of a steering torque as a target value for automatic control, and a driving current of the steering force assisting motor as a feedback value for automatic control.

2. Description of Related Art

In an electric power steering apparatus which controls the driving of a steering force assisting motor based on a current target value of the steering force assisting motor determined on the basis of a steering torque and also on a driving current of the steering force assisting motor, both a fail-safe unit of which must conduct various abnormality judgments, and a control unit in which quick response performance is required are constructed by a single element represented by a microcomputer. Another set of hardware (an electronic circuit having no computer) is used for a unit which monitors the microcomputer.

Such a microcomputer as used for the above purpose is expensive because of its necessity for high performance (high speed) in order to be resistive in use in the control unit required to respond quickly. This increases production costs.

SUMMARY OF THE INVENTION

The invention has been conducted in order to solve the above-mentioned problem. It is an object of the invention to provide an electric power steering apparatus in which a responsivity to a steering operation is enhanced while production costs are reduced.

In the electric power steering apparatus according to the invention, a first control unit which determines a first motor current target value is constructed only by hardware, and a second control unit includes a fail-safe unit not required to respond quickly. The second control unit determines a second motor current target value, and outputs, to the first control unit, a signal for changing the first motor current target value on the basis of the first motor current target value, the second motor current target value, a driving current, and a signal indicative of a condition of a vehicle. According to the configuration in which the control unit is divided into two units which share the role as described above, a responsivity to a steering operation is enhanced, and production costs are reduced. In addition, the system is miniaturized.

The first control unit includes, for example, a gain variable circuit which changes a gain of the first motor current target value on the basis of a gain instruction signal from the second control unit.

The first control unit includes a limit-value changing circuit which changes the limitation of upper and lower limits of the first motor current target value, and a judging unit outputs an upper-and-lower-limit value limiting signal which instructs a limit value of the limit-value changing circuit. In this case, it is possible to prevent the temperature of the system from being excessively raised.

In addition, when a difference between the first motor current target value and the second motor current target value is larger than a predetermined value, the judging unit judges that there is an abnormality, thereby to limit the first and second motor current target values. As a result, the abnormality in the control unit can surely be detected. The two target values have perfectly identical characteristics, so that the driving of the motor is never prohibited unduly and the fundamental performance is not degraded.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiments.

Embodiment 1

Figure 1:
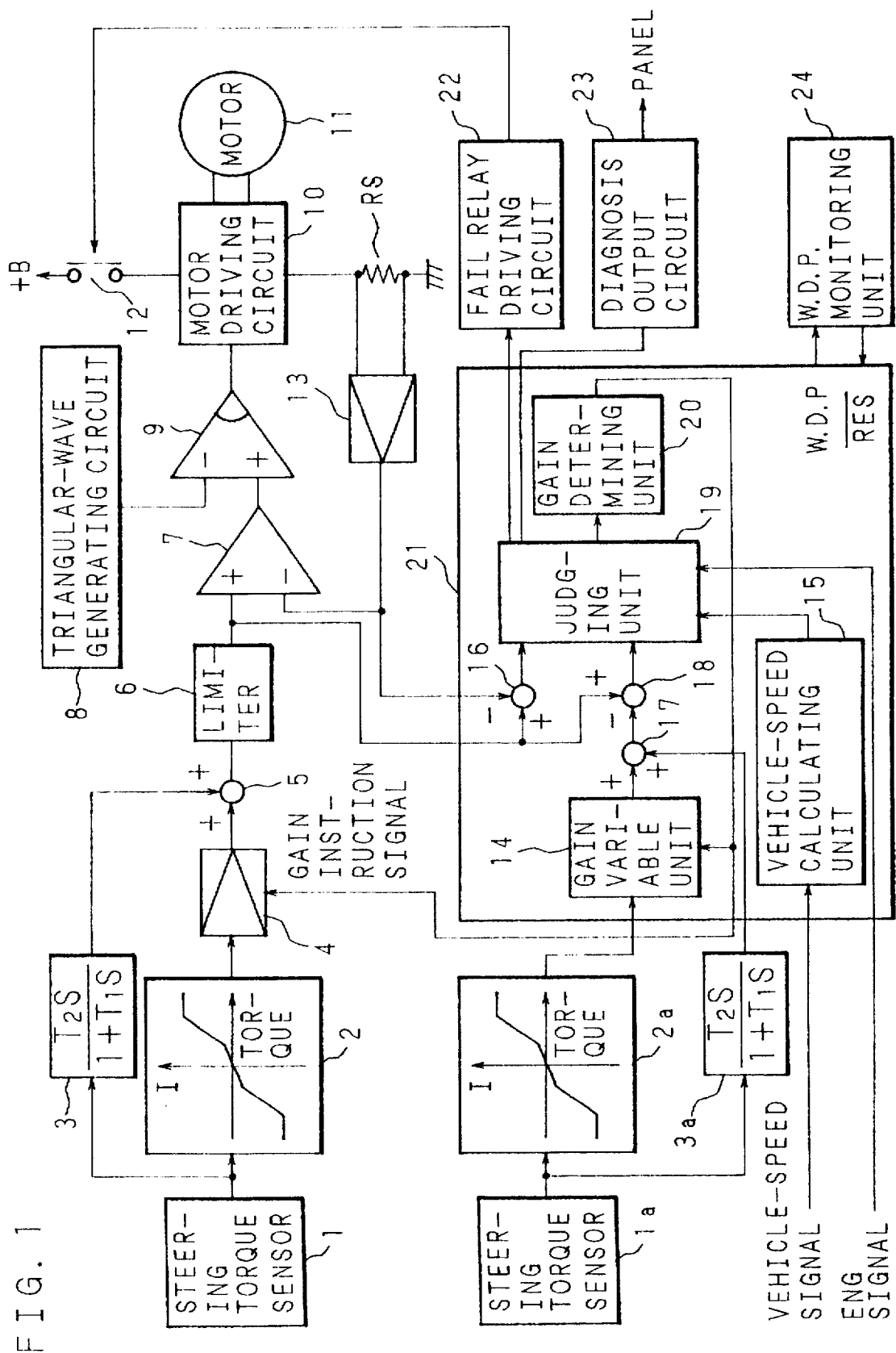
FIG. 1 is a block diagram schematically showing the configuration of an electric power steering apparatus according to Embodiment 1 of the invention.

FIG. 1 is a block diagram schematically showing the configuration of an electric power steering apparatus according to Embodiment 1 of the invention. In the electric power steering apparatus, a steering torque signal from a steering torque sensor 1 disposed at a steering shaft is input to a motor current target value determining circuit 2, and a motor current target value is determined based on the relationship between the steering torque and the motor current target value. The steering torque signal is also inputted to a phase compensating circuit 3 in which a phase of the signal is compensated, and then outputted as a phase-compensated current.

The motor current target value is amplified by a gain variable amplifier 4, added to the phase-compensated current in an adding point 5, and then inputted to a current control circuit 7 via a limiter 6. The current control circuit 7 outputs a current which corresponds to a difference between the motor current target value and a motor driving current from a motor current detecting circuit 13 that will be described later, to a PWM-wave generating circuit 9. The PWM-wave generating circuit 9 generates a PWM wave in accordance with a triangular wave from a triangular-wave generating circuit 8 and the current from the current control circuit 7. The generated PWM wave is outputted to a motor driving circuit 10. On the basis of the PWM wave, the motor driving circuit 10 allows a driving current from a power source B to flow to a motor 11 for assisting the steering force, thereby driving the motor 11. The motor current detecting circuit 13 detects the driving current from a voltage appearing across both ends of a resistor RS through which the driving current flows, and outputs a detection signal of the driving current to the current control circuit 7. A fail relay 12 is connected between the power source B and the motor driving circuit 10.

A steering torque signal from another steering torque sensor 1a which is disposed separately from the steering torque sensor 1 at the steering shaft is inputted to a motor current target value determining circuit 2a which is disposed separately from the motor current target value determining circuit 2. A motor current target value is determined based on the relationship between the steering torque and the motor current target value. The steering torque signal is inputted also to a phase compensating circuit 3a in which the phase of the signal is compensated, and then outputted as a phase-compensated current. The relationship used in the motor current target value determining circuit 2a, and that used in the motor current target value determining circuit 2 have identical characteristics.

The motor current target value and the phase-compensated current are inputted to a microcomputer 21. In the microcomputer 21, the motor current target value is adjusted in a gain variable unit 14, and added to the phase-compensated current in an adding unit 17. A subtracting unit 18 obtains a difference between the motor current target value to which the phase-compensated current is added, and the motor current target value outputted from the limiter 6. The difference is inputted to a judging unit 19. A subtracting unit 16 obtains a difference between the motor current target value outputted from the limiter 6, and the motor driving current from the motor current detecting circuit 13. The difference is inputted to the judging unit 19. Also a vehicle-speed value which is obtained by operating a vehicle-speed signal in a vehicle-speed calculating unit 15 is supplied to the judging unit 19. In addition, an ENG signal which indicates the on/off state of an ignition key is also inputted, in order to determine the on/off condition of the engine.

The judging unit 19 adjusts gains of the gain variable amplifier 4 and the gain variable unit 14 on the basis of these inputs. A gain determining unit 20 determines the gains based on the adjustment results, and sends a gain instruction signal to the gain variable amplifier 4 and the gain variable unit 14. When the difference between the two motor current target values is larger than a predetermined value, the judging unit 19 causes a fail relay driving circuit 22 to output a relay driving current, thereby to turn off the fail relay 12. Then, the judging unit 19 judges the condition of the vehicle, and the judgment result is displayed on an operation panel via a diagnosis output circuit 23.

The microcomputer 21 outputs a watch dog pulse W.D.P. having a predetermined frequency to a W.D.P. monitoring unit 24. When the watch dog pulse W.D.P. fails to have the predetermined frequency, the W.D.P. monitoring unit 24 outputs a reset signal to the microcomputer 21.

Figure 2:
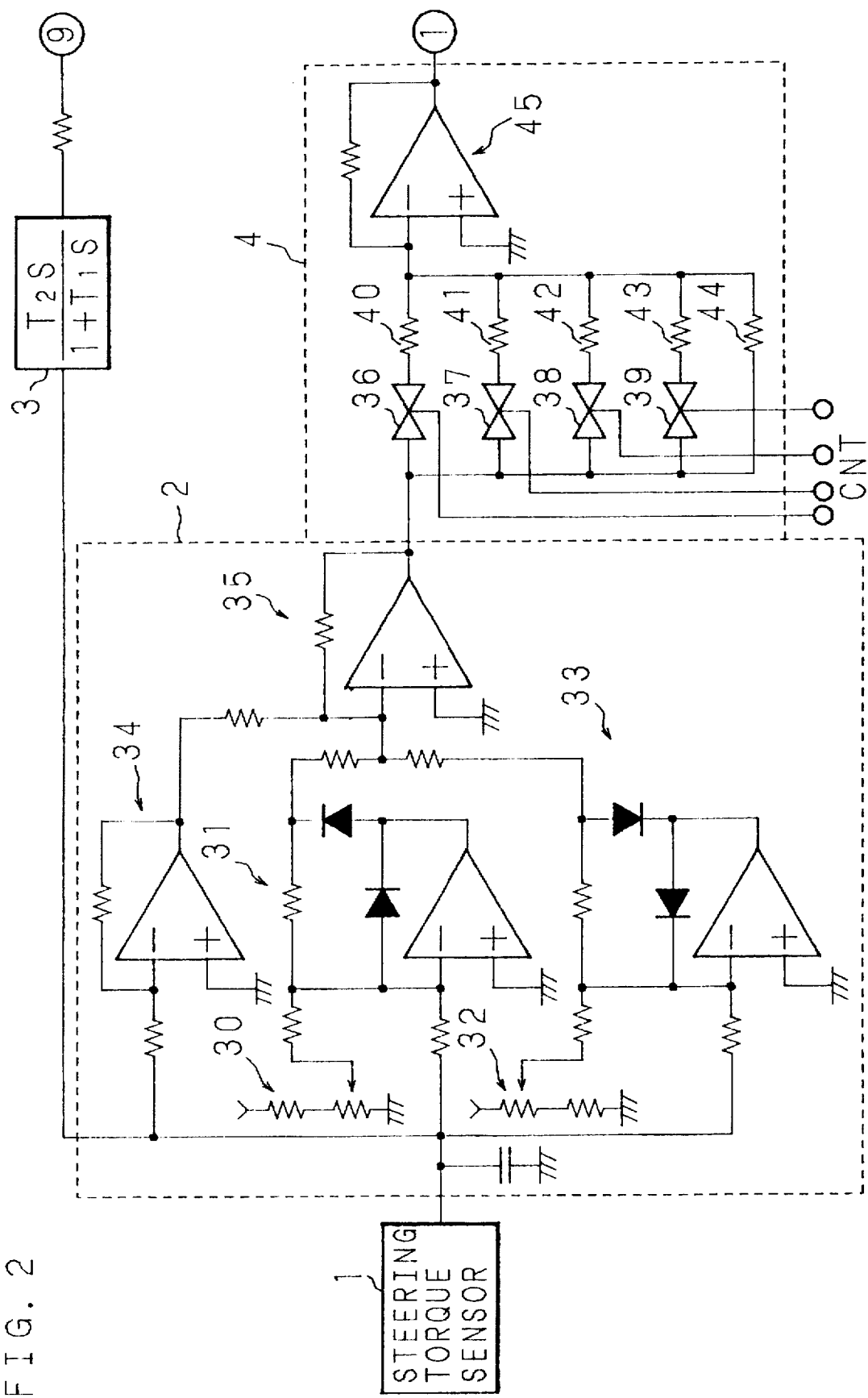
FIG. 2 is a circuit diagram showing a motor current target value determining circuit, a phase compensating circuit, and a gain variable amplifier shown in FIG. 1.

FIG. 2 is a circuit diagram showing in detail the motor current target value determining circuit 2, the phase compensating circuit 3, and the gain variable amplifier 4.

In the motor current target value determining circuit 2, the torque signal from the torque sensor 1 is inputted to an inverting amplifying circuit 34, and also to two ideal diodes 31 and 33 having reversed characteristics each other. Feedback voltages of the ideal diodes 31 and 33 are adjusted by variable resistors 30 and 32, respectively. Each of the ideal diodes 31 and 33 consists of an operational amplifier, two diodes, and a feedback resistor. Outputs of the inverting amplifying circuit 34 and the ideal diodes 31 and 33 are inputted together to an inverting amplifying circuit 35 so as to obtain a characteristic of a motor current target value with respect to the torque signal.

The torque signal from the torque sensor 1 is inputted also to the phase compensating circuit 3.

In the gain variable amplifier 4, the output of the inverting amplifying circuit 35 is inputted to an analog switch circuit. In the analog switch circuit, series circuits of switch circuits 36, 37, 38, and 39 and resistors 40, 41, 42, and 43, and a resistor 44 are connected in parallel. An output of the analog switch circuit is supplied to an inverting amplifying circuit 45. The gain instruction signal (digital signal) from the microcomputer 21 (FIG. 1) is supplied to the switch circuits 36, 37, 38, and 39. A gain of the motor current target value determining circuit 2 is adjusted by turning on/off these switch circuits.

Figure 3:
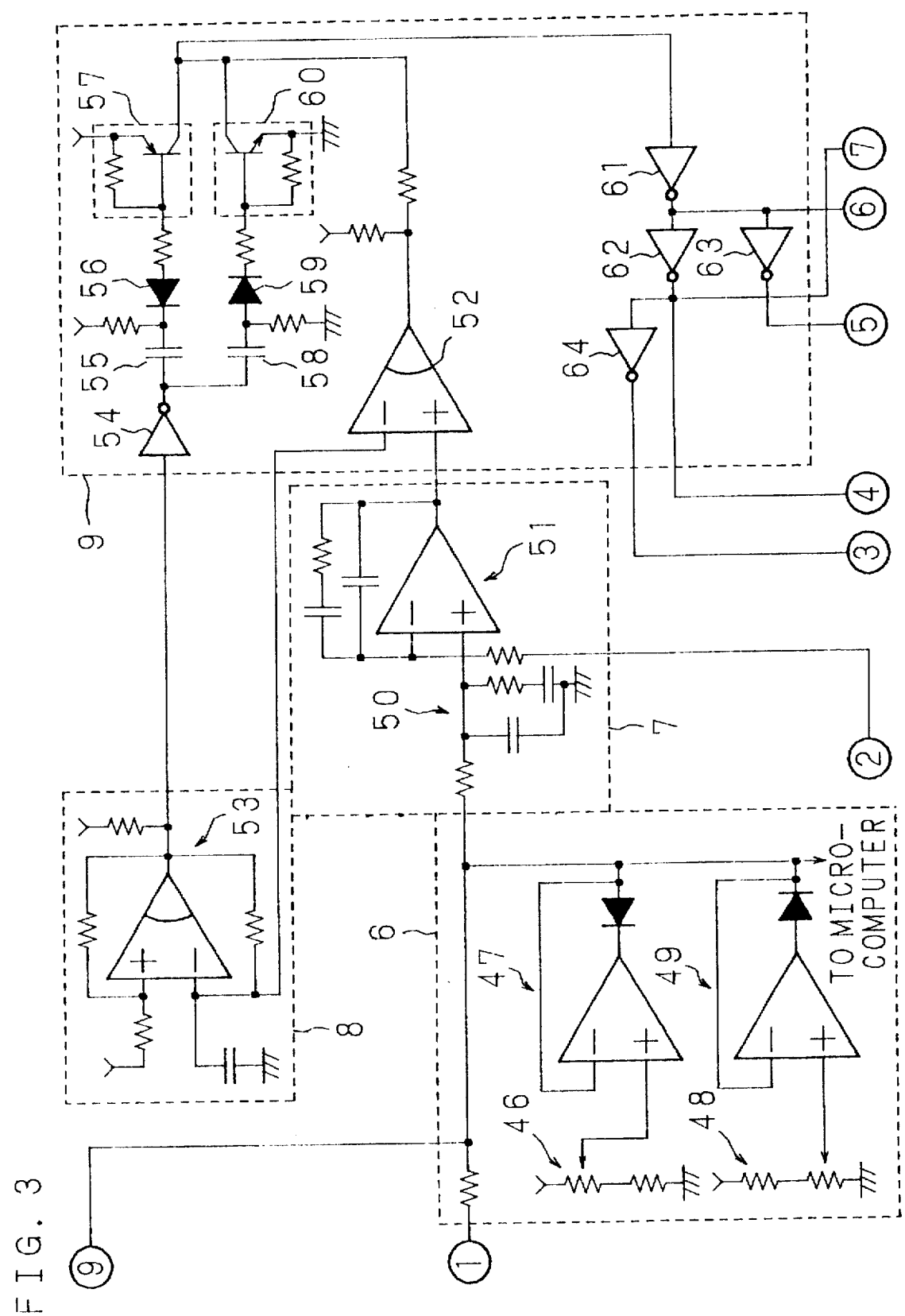
FIG. 3 is a circuit diagram showing a limiter, a current control circuit, a triangular-wave generating circuit, and a PWM-wave generating circuit shown in FIG. 1.

FIG. 3 is a circuit diagram showing in detail the limiter 6, the current control circuit 7, the triangular-wave generating circuit 8, and the PWM-wave generating circuit 9.

In the limiter 6, an output of the inverting amplifying circuit 45 (FIG. 2) which is phase-compensated by the output of the phase compensating circuit 3 is applied to output terminals of two operational amplifiers 47 and 49 via diodes which are reversed in direction from each other, respectively, and also to inverting input terminals of the amplifiers. Voltages which are to be applied to non-inverting input terminals of the operational amplifiers 47 and 49 are adjusted by variable resistors 46 and 48, respectively. In each of the operational amplifiers 47 and 49, if the signal voltage applied to the inverting input terminal is higher or lower than the voltage applied to the non-inverting input terminal, a forward voltage of the respective diode is outputted so that the signal voltage applied to the inverting input terminal is not higher or lower than the voltage applied to the non-inverting input terminal.

The output of the inverting amplifying circuit 45 (FIG. 2) which is phase-compensated by the output of the phase compensating circuit 3 is supplied to the microcomputer 21 (FIG. 1), and also to a non-inverting input terminal of a differential amplifying circuit 51 consisting of an operational amplifier, via a filter circuit which is formed of a parallel circuit comprising a series circuit of a resistor and a capacitor, and another capacitor. The output of the motor current detecting circuit 13 (FIGS. 1 and 5) is applied to the inverting input terminal of the differential amplifying circuit 51. The filter circuit and the differential amplifying circuit 51 constitute the current control circuit 7.

In the triangular-wave generating circuit 8, a predetermined voltage is applied to a non-inverting input terminal of an operational amplifier 53 which includes a positive feedback resistor and a negative feedback resistor. An inverting input terminal of the amplifier 53 is grounded via a capacitor.

In the PWM-wave generating circuit 9, an output of the operational amplifier 53 is inverted by an inverter 54 and then inputted to a base of a PNP transistor 57 via a capacitor 55 and a diode 56 which is directed backward. A junction of the capacitor 55 and the diode 56 is pulled up to a predetermined voltage by a resistor. An output of the inverter 54 is inputted also to a base of an NPN transistor 60 via a capacitor 58 and a diode 59 which is directed forward. A junction of the capacitor 58 and the diode 59 is pulled down to a predetermined voltage by a resistor.

The voltage of the inverting input terminal of the operational amplifier 53 is applied to an inverting input terminal of a differential amplifying circuit 52. An output of the differential amplifying circuit 51 is applied to a non-inverting input terminal of the differential amplifying circuit 52. An output of the differential amplifying circuit 52 is applied to the collectors of the PNP transistor 57 and the NPN transistor 60. As a result, the PNP transistor 57 and the NPN transistor 60 are respectively turned on/off in synchronization with the triangular wave from the operational amplifier 53, and at a time corresponding to the output of the differential amplifying circuit 52. Voltages of the collectors of the PNP transistor 57 and the NPN transistor 60 are branched, inverted, and/or amplified, as required, by inverters 61 to 64, and then supplied to the motor driving circuit 10.

Figure 4:
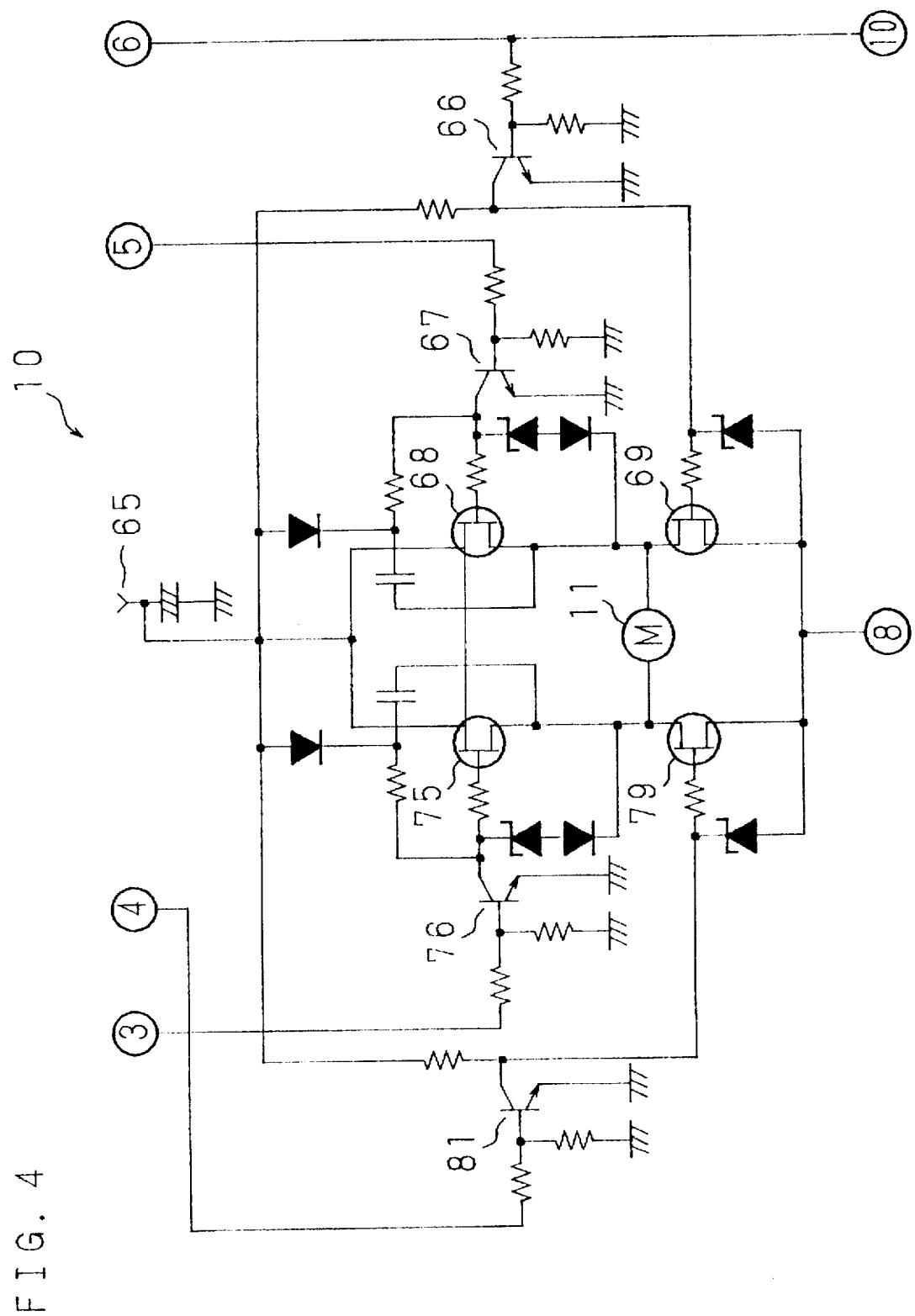
FIG. 4 is a circuit diagram showing a motor driving circuit shown in FIG. 1.

FIG. 4 is a circuit diagram showing the motor driving circuit 10 in detail. The motor driving circuit 10 includes field-effect transistors 68, 69, 75, and 79 which are connected between a power source 65 and a ground terminal so as to form a bridge. The motor 11 is connected in a manner to link a junction of the field-effect transistors 75 and 79 to that of the field-effect transistors 68 and 69. The two pairs of field-effect transistors 75 and 69, and 68 and 79 which are connected in series via the motor 11 are driven by the PWM-wave signal fed from the PWM-wave generating circuit 9 to respective gates. The PWM-wave signals applied to the field-effect transistors 75 and 69 are inverted in phase to those applied to the field-effect transistors 68 and 79.

The PWM-wave signal from the inverter 61 of the PWM-wave generating circuit 9 (FIG. 3) is inputted to a base of the NPN transistor 66. An inverted output from a collector of the NPN transistor 66 is inputted to a gate of the field-effect transistor 69. The PWM-wave signal which has passed through the inverters 61 and 62 is inputted to a base of an NPN transistor 81. An inverted output from a collector of the NPN transistor 81 is inputted to a gate of the field-effect transistor 79. The PWM-wave signal which has passed through the inverters 61 and 63 is inputted to a base of an NPN transistor 67. An inverted output from a collector of the NPN transistor 67 is inputted to a gate of the field-effect transistor 68. The PWM-wave signal which has passed through the inverters 61, 62, and 64 is inputted to a base of an NPN transistor 76. An inverted output from a collector of the NPN transistor 76 is inputted to a gate of the field-effect transistor 75.

Figure 5:
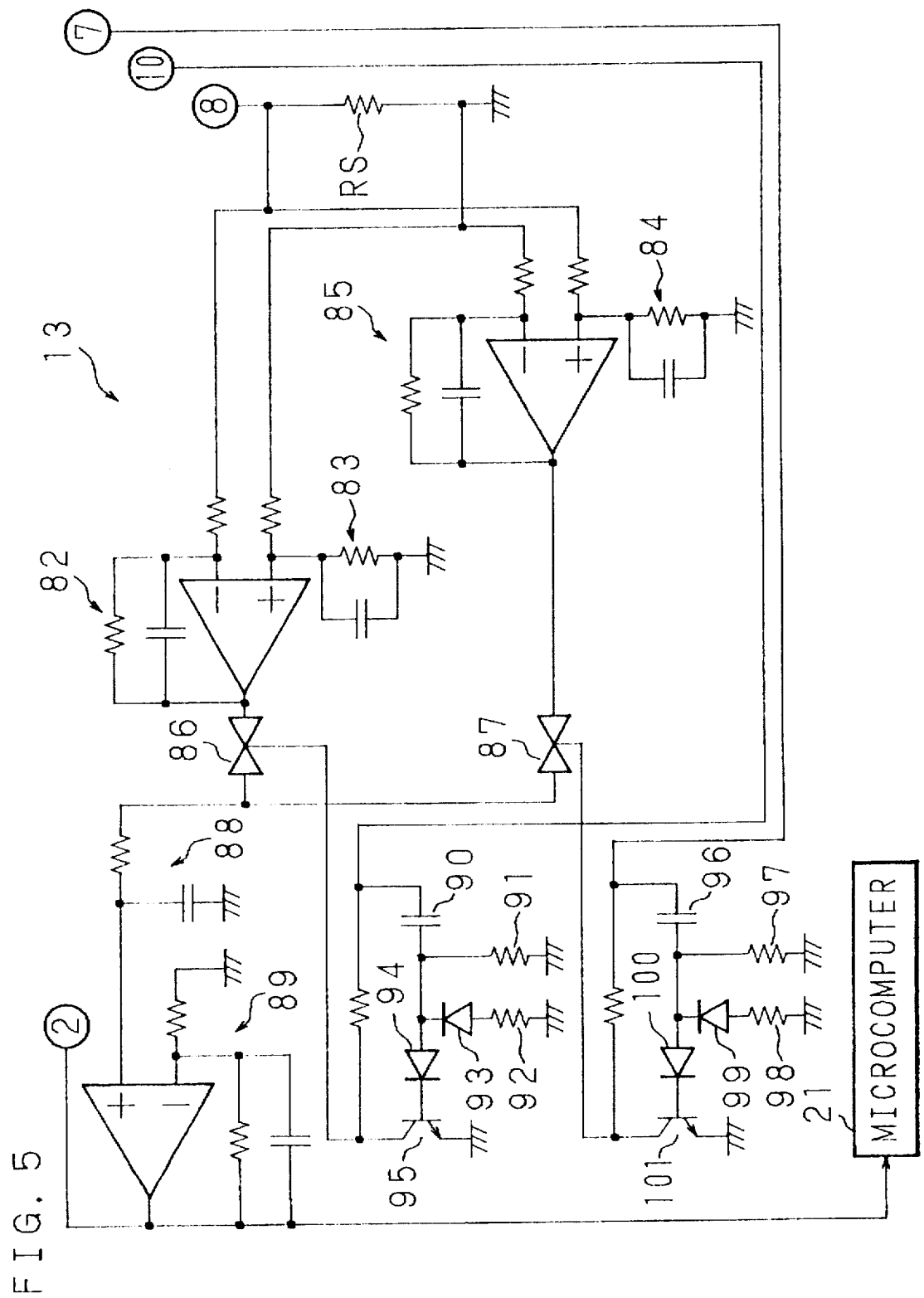
FIG. 5 is a circuit diagram showing a motor current detecting circuit shown in FIG. 1.

FIG. 5 is a circuit diagram showing the motor current detecting circuit 13 in detail. In the motor current detecting circuit 13, a voltage on the side of a bridge circuit of the resistor RS which is connected between the motor driving circuit 10 and the ground terminal is applied to a non-inverting input terminal of a differential amplifying circuit 85, and also to an inverting input terminal of a differential amplifying circuit 82. A voltage on the side of the ground of the resistor RS is applied to an inverting input terminal of the differential amplifying circuit 85, and also to a non-inverting input terminal of the differential amplifying circuit 82. Filter circuits 84 and 83 each consisting of a resistor and a capacitor which are connected in parallel are connected to the non-inverting input terminals of the differential amplifying circuits 85 and 82, respectively. Switch circuits 87 and 86 are connected to output terminals of the differential amplifying circuits 85 and 82, respectively.

The PWM-wave signal from the inverter 61 of the PWM-wave generating circuit 9 is inputted to a base of an NPN transistor 95 via an edge shaping circuit for intensifying edges of the PWM-wave signal. The edge shaping circuit includes a capacitor 90, a resistor 91 which is grounded on one side, a series circuit of a resistor 92 which is grounded on one side and a reverse-connected diode 93, and a forward-connected diode 94.

The PWM-wave signal which has passed through the inverters 61 and 62 of the PWM-wave generating circuit 9 is inputted to a base of an NPN transistor 101 via another edge shaping circuit. The edge shaping circuit includes a capacitor 96, a resistor 97 which is grounded on one side, a series circuit of a resistor 98 which is grounded on one side and a reverse-connected diode 99, and a forward-connected diode 100.

The voltage appearing across both ends of the resistor RS is inputted to the differential amplifying circuit 82 and the differential amplifying circuit 85, at polarities inverted from each other. The NPN transistors 95 and 101 are turned on/off by the PWM-wave signals having phases reversed from each other, thereby to turn on/off the switch circuits 86 and 87, respectively. As a result, a voltage having a polarity corresponding to a direction of the current flowing through the motor 11 (FIG. 4) and in accordance with the current flowing through the resistor RS is applied to a differential amplifying circuit 89. An integration circuit comprising a resistor and a capacitor is placed precedently to the differential amplifying circuit 89. An output of the differential amplifying circuit 89 is applied to the inverting input terminal of the differential amplifying circuit 51 (FIG. 3) included in the current control circuit 7, and also to the microcomputer 21.

Figure 6:
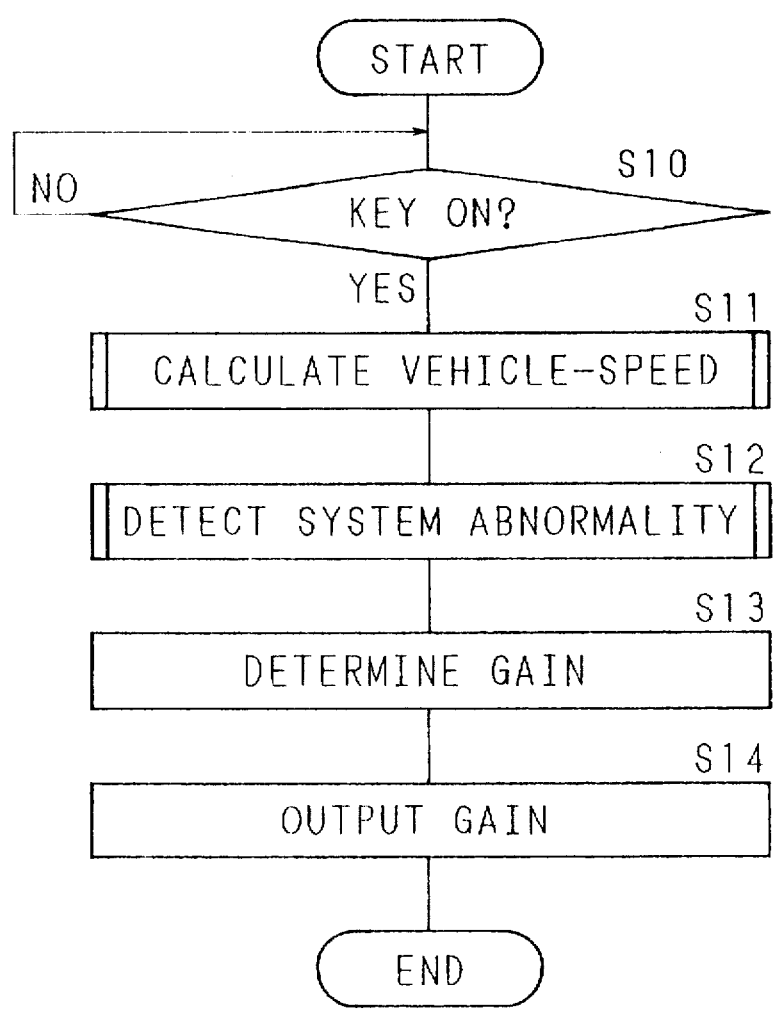
FIG. 6 is a flowchart illustrating an operation in Embodiment 1.
Figure 7:
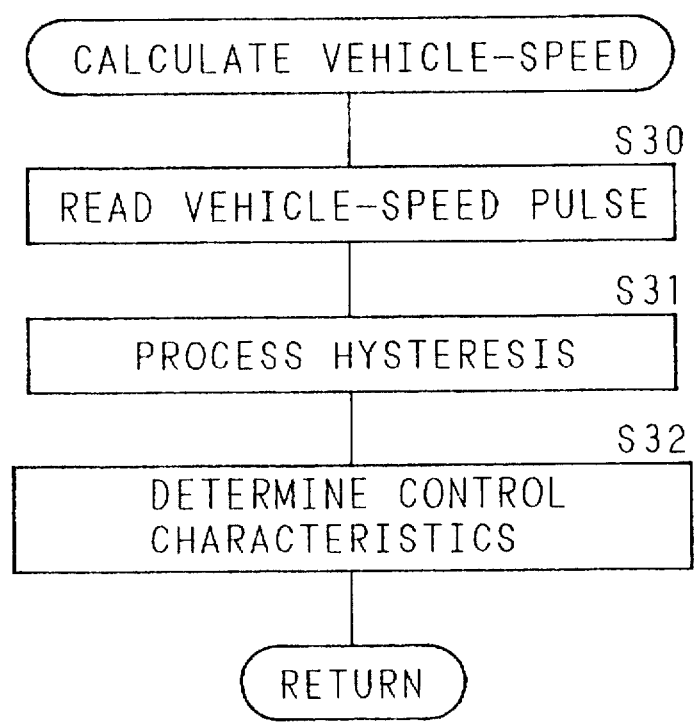
FIG. 7 is a flowchart illustrating an operation in Embodiment 1.

Hereinafter, the operation of determining a gain in the electric power steering apparatus having the above-described configuration will be described with reference to flowcharts shown in FIGS. 6, 7, and 9.

The judging unit 19 detects the on/off state of the ignition key based on the ENG signal (step S10). When the ignition key is in the off state, the judging unit 19 continues the monitoring operation.

Figure 8:
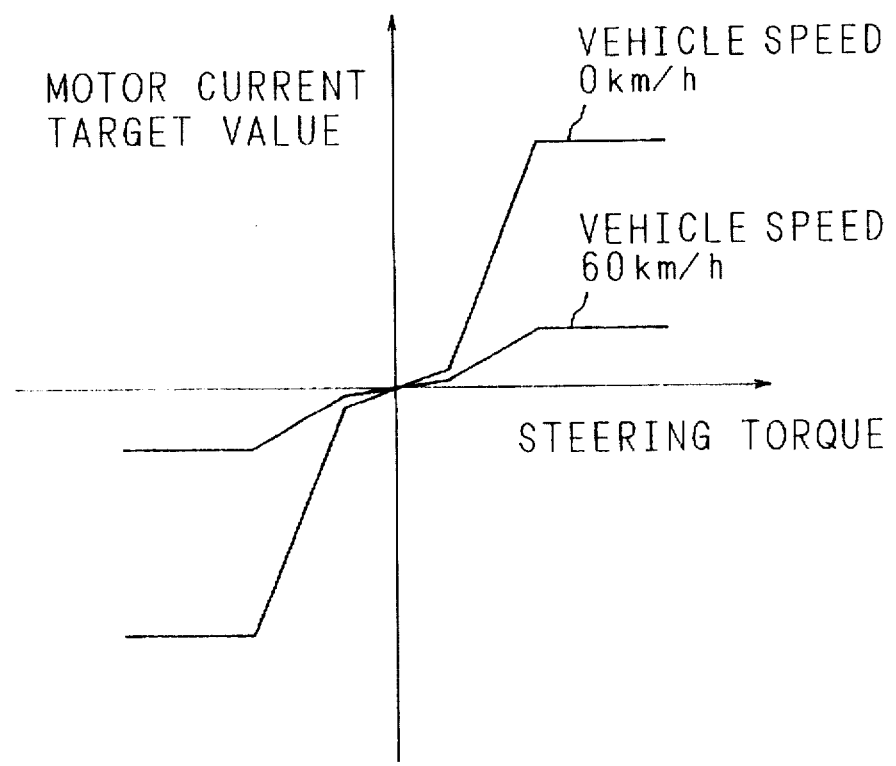
FIG. 8 is a characteristic diagram showing a relationship between a steering torque and a motor current target value.

When the ignition key is in the on state, the judging unit 19 calculates the vehicle-speed (step S11). FIG. 7 shows a flowchart of the vehicle-speed calculation (step S11). The judging unit 19 reads a vehicle-speed value (pulses) calculated in the vehicle-speed calculating unit 15 (step S30), conducts a hysteresis process on the vehicle-speed value (step S31), and thereafter determines control characteristics of the steering torque and the motor current target value at the vehicle-speed value (step S32). With respect to the control characteristics, for example, the gain is adapted to be reduced as the vehicle-speed is increased, as shown in FIG. 8. After the control characteristics are determined, a system abnormality detection (step S12) shown in FIG. 6 is executed.

Figure 9:
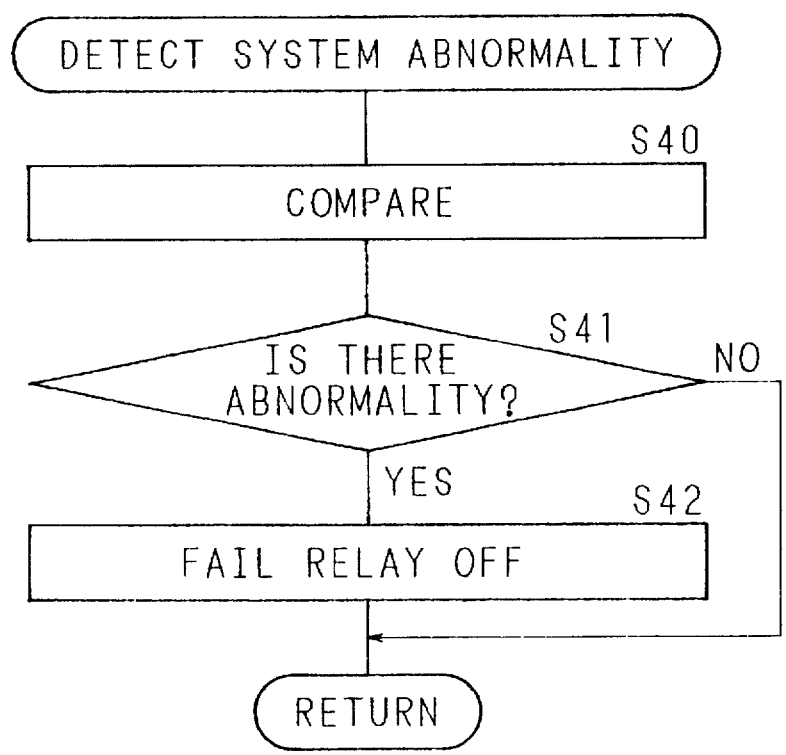
FIG. 9 is a flowchart illustrating an operation in Embodiment 1.

FIG. 9 shows a flowchart of the system abnormality detection (step S12). The judging unit 19 compares a value supplied from the subtracting unit 18, or that supplied from the subtracting unit 16 with a respective predetermined value (step S40). If the supplied value is larger than the predetermined value, the judging unit 19 judges that there is an abnormality (step S41). If there is no abnormality, the process proceeds to a gain determining step (S13) in FIG. 6. If there is an abnormality, the fail relay driving circuit 22 is let to output the relay driving current, so that the fail relay 12 is turned off (step S42). Thereafter, the process proceeds to step S13.

In the gain determination (step S13), the judging unit 19 determines upper and lower limits of the motor current target value on the basis of the control characteristics determined in the vehicle-speed calculation step S11 and the detection result in the system abnormality detection step S12 respectively, and selects a pair of upper and lower limits having a minimum absolute value among a plurality of upper and lower limits corresponding to respective vehicle-speed values. In other words, the absolute value of the upper and lower limits is reduced as the vehicle-speed is increased, and the absolute value is zero when there is an abnormality. The gain determining unit 20 determines the gain based on the selected upper and lower limits, and outputs the gain instruction signal to the gain variable amplifier 4 and the gain variable unit 14 (step S14).

The gain variable amplifier 4 and the gain variable unit 14 receive the gain instruction signal, and change the respective gains. After the gain instruction signal is outputted, the above-mentioned processing is conducted again from the beginning.

In this way, it is possible to use hardware for the control unit in which quick response is required, and to use an inexpensive microcomputer for the fail-safe unit in which various abnormality judgments are required. Accordingly, it is possible to reduce the production cost.

Embodiment 2

Figure 10:
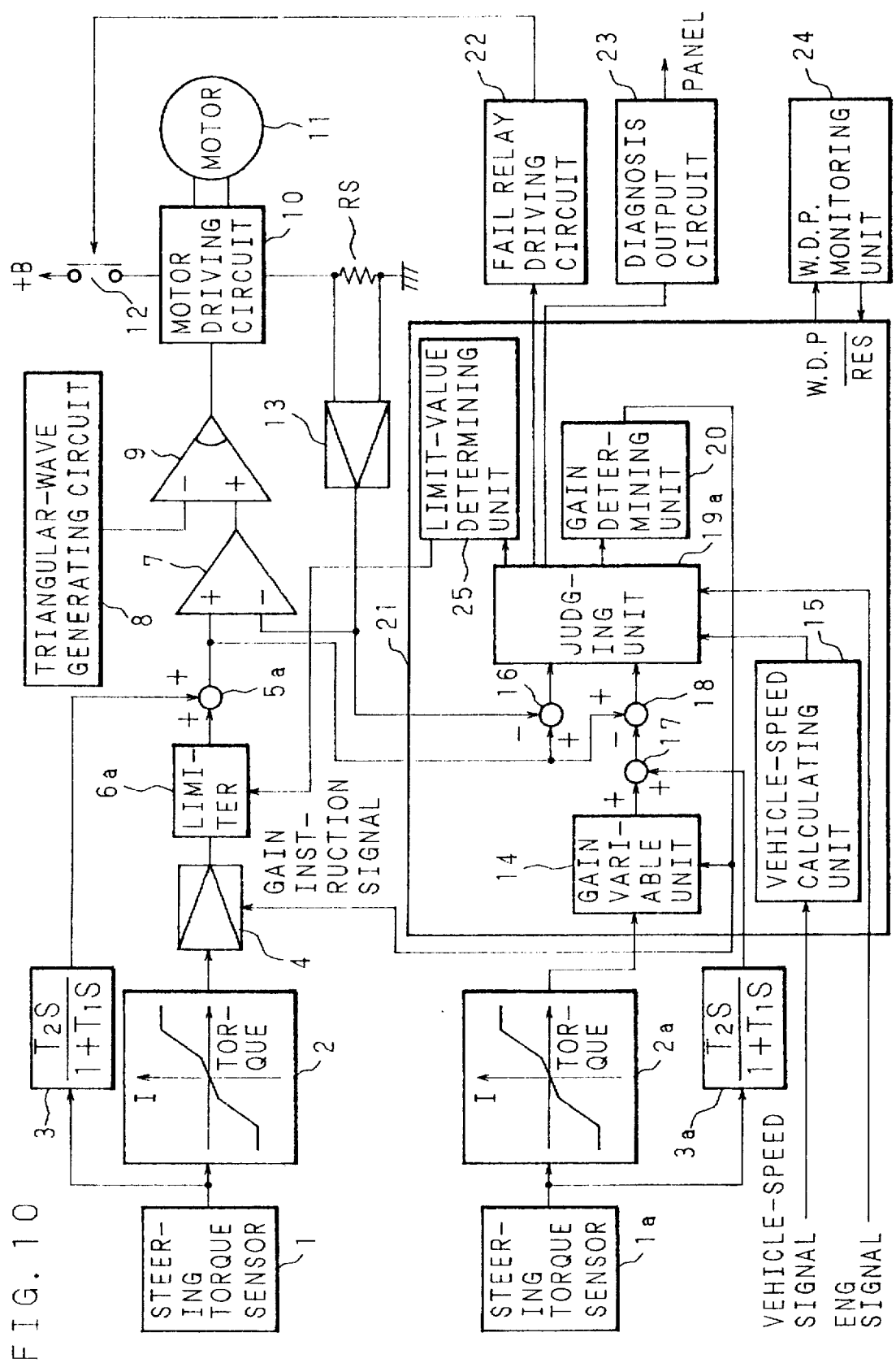
FIG. 10 is a block diagram schematically showing the configuration of an electric power steering apparatus according to Embodiment 2 of the invention.

FIG. 10 is a block diagram schematically showing the configuration of an electric power steering apparatus according to Embodiment 2. In the electric power steering apparatus, a motor current target value is amplified in the gain variable amplifier 4, inputted to a limiter 6a thereby to be limited by a predetermined limitation, added to a phase-compensated current in an adding point 5a, and then inputted to the current control circuit 7.

A judging unit 19a adjusts upper and lower limits of the motor current target value based on the difference obtained in the subtracting unit 18, the difference obtained in the subtracting unit 16, the vehicle-speed value calculated in the vehicle-speed calculating unit 15, and the signal indicative of the on/off state of the ignition key (ENG signal.). A limit-value determining unit 25 sends an upper-and-lower-limit signal of the motor current target value in accordance with the adjustment result, to the limiter 6a. The other configurations are the same as those of the electric power steering apparatus of Embodiment 1, and hence their description is omitted.

Figure 11:
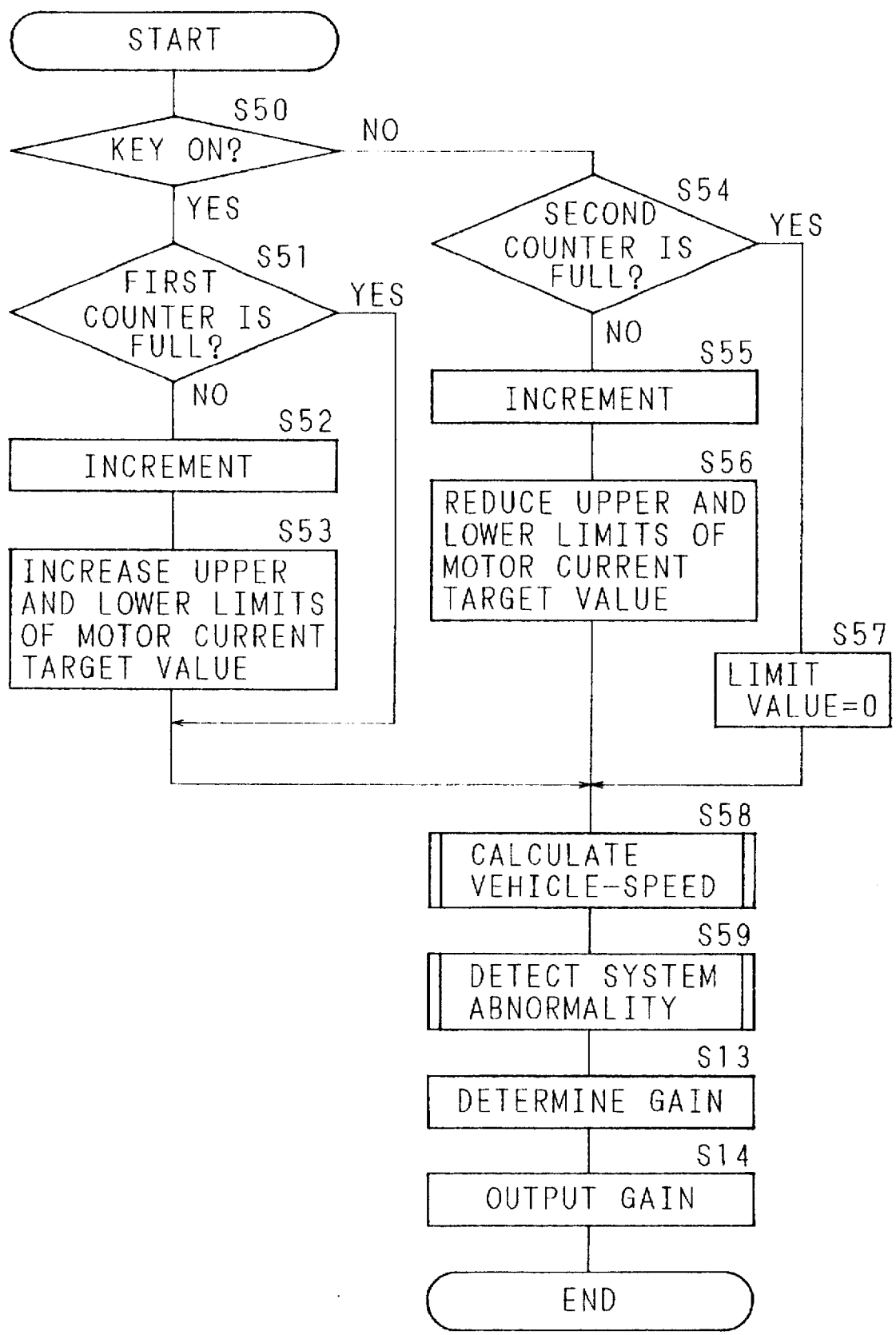
FIG. 11 is a flowchart illustrating an operation in Embodiment 2.

Hereinafter, the operation of determining a gain in the electric power steering apparatus having the above-described configuration will be described with reference to flowcharts shown in FIGS. 11 to 13.

The judging unit 19a judges whether the ignition key is in the on state or not (step S50). If the ignition key is in the on state, the judging unit 19a judges whether a count value of a first counter is full or not (step S51). If the count value of the first counter is not full, the first counter is incremented by one (step S52). Conforming to this, the upper and lower limits of the motor current target value are slightly increased (step S53). As a result, the limit-value determining unit 25 slightly increases the upper-and-lower-limit signal of the motor current target value, and sends the signal to the limiter 6a. When the limiter 6a receives the signal, the upper and lower limits for the motor current target value supplied from the gain variable amplifier 4 are slightly increased. If the count value of the first counter is full in step S51, the vehicle-speed calculation (step S58) is executed.

If the ignition key is in the off state in step S50, the judging unit 19a judges whether a count value of a second counter is full or not (step S54). If the count value of the second counter is not full, the second counter is incremented by one (step S55). In consequence, the upper and lower limits for the motor current target value are slightly reduced (step S56). As a result, the limit-value determining unit 25 slightly reduces the upper-and-lower-limit signal of the motor current target value, and sends the signal to the limiter 6a. When the limiter 6a receives the signal, the upper and lower limits for the motor current target value supplied from the gain variable amplifier 4 are slightly reduced. If the count value of the second counter is full in step S54, the limit value is set to be zero (step S57), and the process proceeds to step S58.

Figure 12:
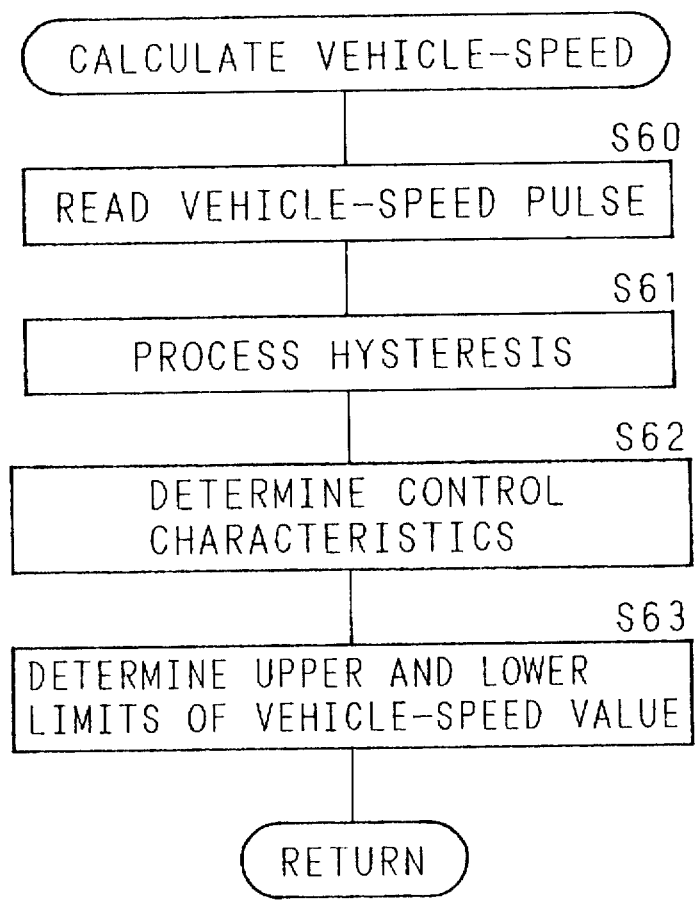
FIG. 12 is a flowchart illustrating an operation in Embodiment 2.

FIG. 12 shows a flowchart of the vehicle-speed calculation (step S58). The judging unit 19a reads a vehicle-speed value (pulses) calculated in the vehicle-speed calculating unit 15 (step S60), and conducts a hysteresis process on the vehicle-speed value (step S61), and thereafter determines control characteristics of the steering torque and the motor current target value at the vehicle-speed value (step S62). After the upper and lower limits for the motor current target value at the vehicle-speed value are determined based on the control characteristics (step S63), the system abnormality detection (step S59) shown in FIG. 11 is executed.

Figure 13:
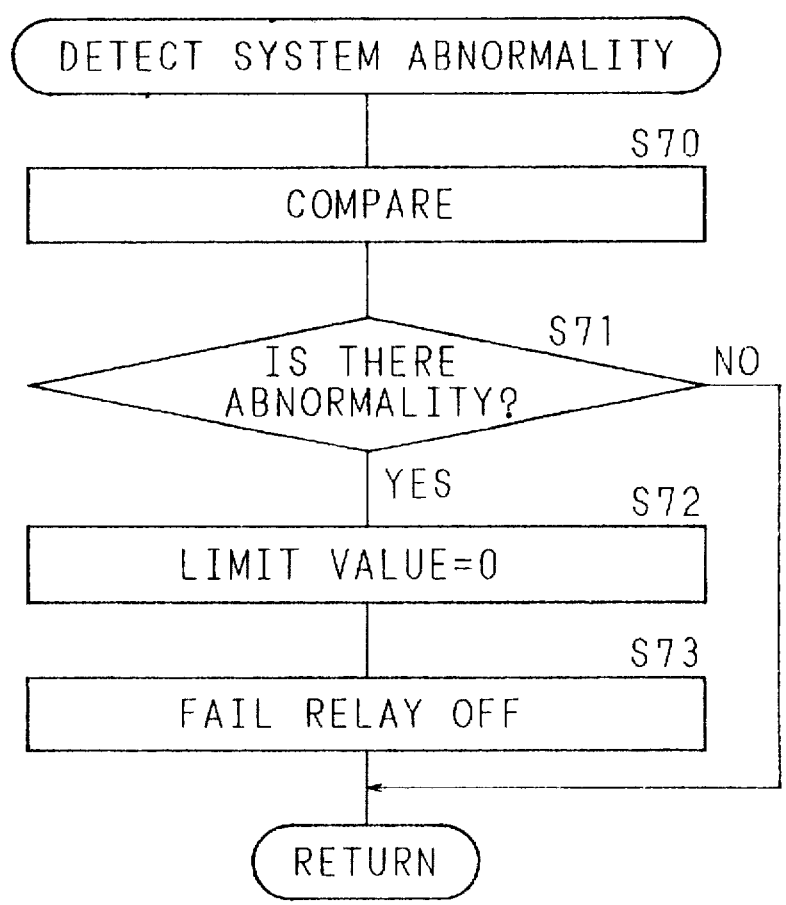
FIG. 13 is a flowchart illustrating an operation in Embodiment 2.

FIG. 13 shows a flowchart of the system abnormality detection (step S59). The judging unit 19a compares a difference obtained in the subtracting unit 18, or a difference obtained in the subtracting unit 16 with a respective predetermined value (step S70). When the difference is larger than the predetermined value, the judging unit 19a judges that there is an abnormality (step S71). If there is no abnormality, the gain is determined (step S13). If there is an abnormality, the judging unit 19a sets the upper and lower limits for the motor current target value to be zero (step S72). As a result, the limit-value determining unit 25 sets the upper-and-lower-limit signal of the motor current target value to be zero, and sends the signal to the limiter 6a. When the limiter 6a receives the signal, the motor current target value supplied from the gain variable amplifier 4 is set to be zero. In addition, the fail relay driving circuit 22 is let to output the relay driving current, thereby to turn off the fail relay 12 (step S73), and the process proceeds to step S13.

In the gain determination (step S13), the judging unit 19a selects minimum upper and lower limits (absolute values) among the upper and lower limits of the motor current target values which are respectively determined in the step of monitoring the on/off state of the ignition key, the vehicle-speed calculation step, and the system abnormality detection step. The gain determining unit 20 determines the gain based on the upper and lower limits, and outputs the gain instruction signal to the gain variable amplifier 4 and the gain variable unit 14 (step S14).

In Embodiment 2, in addition to the effects attained in Embodiment 1, it is possible to gradually increase the gains of the gain variable amplifier 4 and the gain variable unit 14, and the upper and lower limits for the motor current target value of the limiter 6a, so that a shock at the start of the electric power steering apparatus can be reduced.

By appropriately limiting the current flowing through the motor 11 and the control circuit thereof, it is possible to prevent the motor 11 and the control circuit therefor from being overheated. As a result, it becomes possible to realize an optimum thermal design, and to miniaturize the electric power steering apparatus.

Embodiment 3

Figure 14:
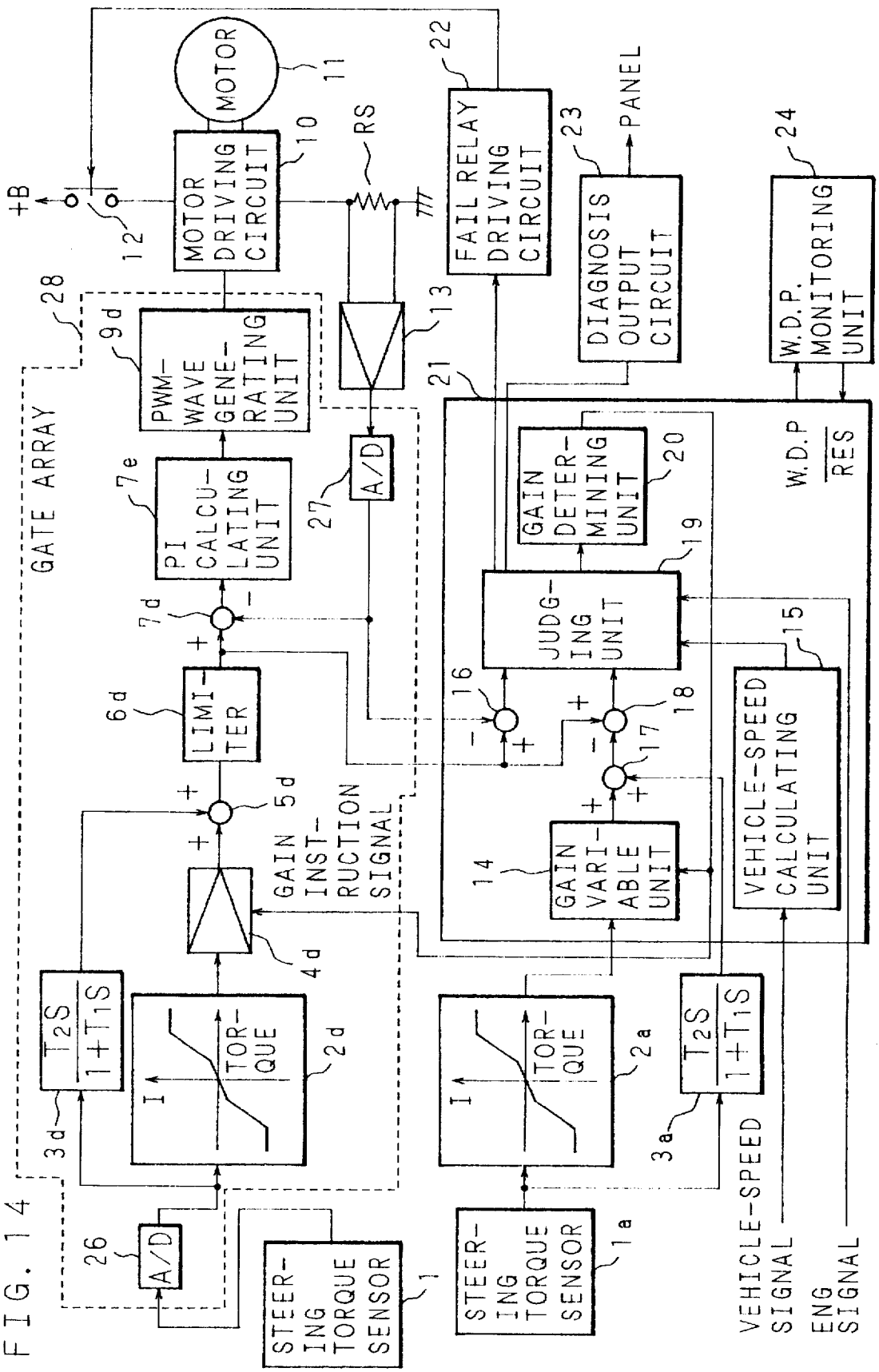
FIG. 14 is a block diagram schematically showing the configuration of an electric power steering apparatus according to Embodiment 3 of the invention.

FIG. 14 is a block diagram schematically showing the configuration of an electric power steering apparatus according to Embodiment 3. In the electric power steering apparatus, a steering torque signal from the steering torque sensor 1 disposed at the steering shaft is converted into a digital signal in an A/D converter 26, and inputted to a motor current target value determining circuit 2d. In the motor current target value determining circuit 2d, a motor current target value is determined based on the relationship between the steering torque and the motor current target value. The steering torque signal which has been converted into a digital signal is inputted also to the phase compensating circuit 3d in which the phase of the signal is compensated. Then, the signal is outputted as a phase-compensated current.

The digital signal of the motor current target value is calculated (amplified) in a gain variable calculating unit 4d, and then added to the digital signal of the phase-compensated current in an adding point 5d. Then, the added signal is inputted to a subtracting point 7d via a limiter 6d. In the subtracting point 7d, a difference between the digital signal of the motor current target value and a digital signal of a motor driving current from the motor current detecting circuit 13 which will be described later is obtained. A digital signal corresponding to the obtained difference is inputted to a PI calculating unit 7e. The PI calculating unit 7e conducts a proportional operation and an integration operation based on the inputted digital signal. The calculation results are outputted to a PWM-wave generating unit 9d.

The PWM-wave generating unit 9d generates a PWM wave in accordance with the calculation results from the PI calculating unit 7e, and outputs the wave to the motor driving circuit 10. On the basis of the PWM wave, the motor driving circuit 10 allows a driving current from the power source B to flow to the motor 11 for assisting the steering force, thereby driving the motor 11. The motor current detecting circuit 13 detects the driving current based on a voltage appearing across both ends of the resistor RS through which the driving current flows, and a detection signal of the driving current is outputted to an A/D converter 27. The A/D converter 27 converts the detection signal of the driving current into a digital signal, and outputs the digital signal to the subtracting point 7d and the subtracting point 16 in the microcomputer 21.

The A/D converter 26, the motor current target value determining circuit 2d, the phase compensating circuit 3d, the gain variable calculating unit 4d, the adding point 5d, the limiter 6d, the subtracting point 7d, the PI calculating unit 7e, the PWM-wave generating unit 9d, and the A/D converter 27 are included in a gate array 28. The other configurations are the same as those of the electric power steering apparatus of Embodiment 1, and hence their description is omitted.

The operation of the electric power steering apparatus having the above-described configuration is the same as that of the electric power steering apparatus of Embodiment 1 except that the operation in the gate array 28 is performed by using the digital signals which are A/D converted by the A/D converters 26 and 27. Accordingly, the description of the operation is omitted.

According to this configuration, it is possible to use hardware for the control unit (gate array: a custom IC) in which quick response is required, and to use an inexpensive microcomputer for the fail-safe unit in which various abnormality judgments are required. Accordingly, it is possible to reduce the production cost.

Embodiment 4

Figure 15:
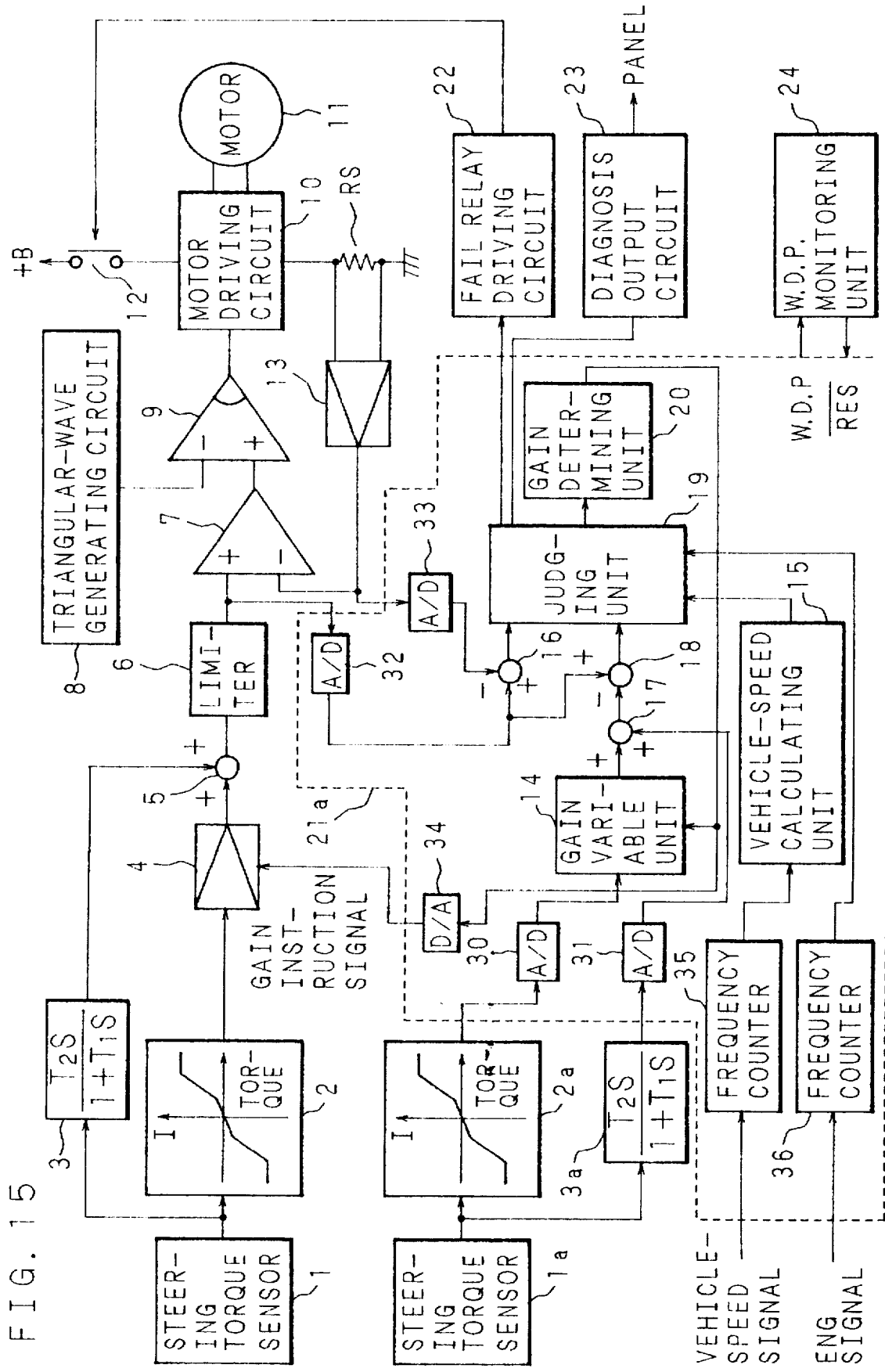
FIG. 15 is a block diagram schematically showing the configuration of an electric power steering apparatus according to Embodiment 4 of the invention.

FIG. 15 is a block diagram schematically showing the configuration of an electric power steering apparatus according to Embodiment 4. In the electric power steering apparatus, a steering torque signal from the steering torque sensor 1a disposed at the steering shaft is inputted to the motor current target value determining circuit 2a in which a motor current target value is determined based on the relationship between the steering torque and the motor current target value. The steering torque signal is also inputted to a phase compensating circuit 3a in which the phase of the signal is compensated. Then, the signal is outputted as a phase-compensated current.

The motor current target value and the phase-compensated current are converted into digital signals by A/D converters 30 and 31, and inputted to the gain variable unit 14 and the adding unit 17, respectively. The motor current target value (a digital signal) is adjusted in the gain variable unit 14, and then added to the phase-compensated current (a digital signal) in the adding unit 17. The motor current target value outputted from the limiter 6 is A/D converted in an A/D converter 32. A subtracting unit 18 subtracts the motor current target value (a digital signal) outputted from the adding unit 17 from the motor current target value A/D converted in the A/D converter 32. The obtained difference is supplied to the judging unit 19.

A motor driving current outputted from the motor current detecting circuit 13 is A/D converted in an A/D converter 33. The subtracting unit 16 subtracts the motor driving current A/D converted in the A/D converter 33 from the motor current target value A/D converted in the A/D converter 32. The obtained difference is supplied to the judging unit 19.

A vehicle-speed signal is converted into a digital signal in a frequency counter 35, and calculated in the vehicle-speed calculating unit 15. The obtained value is supplied to the judging unit 19 as a vehicle-speed value. An ENG signal is converted into a digital signal in a frequency counter 36, and inputted to the judging unit 19 as a signal indicative of the number of revolutions of the engine.

The judging unit 19 adjusts the gains of the gain variable unit 14 and the gain variable amplifier 4 on the basis of these inputs. The gain determining unit 20 determines the gains based on the adjustment results, and sends gain instruction signals to the gain variable unit 14, and to the gain variable amplifier 4 via a D/A converter 34. When the difference between the above-mentioned two motor current target values is larger than a predetermined value, the judging unit 19 instructs the fail relay driving circuit 22 to output the relay driving current, thereby to turn off the fail relay 12. In addition, the judging unit 19 judges the condition of the vehicle. The judgment result is displayed on the operation panel via the diagnosis output circuit 23.

The A/D converters 30 to 33, the gain variable unit 14, the adding unit 17, the subtracting unit 18, the judging unit 19, the subtracting unit 16, the frequency counters 35 and 36, the vehicle-speed calculating unit 15, the gain determining unit 20, and the D/A converter 34 are included in a gate array 21a (a custom IC).

The gate array 21a outputs a watch dog pulse W.D.P. having a predetermined frequency to the W.D.P. monitoring unit 24. When the watch dog pulse W.D.P. fails to have the predetermined frequency, the W.D.P. monitoring unit 24 outputs a reset signal to the gate array 21a.

The other configurations are the same as those of the electric power steering apparatus of Embodiment 1, and hence their description is omitted.

In the electric power steering apparatus of Embodiment 4, the operation of the gate array 21a is performed by using the digital signals which are respectively converted by the A/D converters 30 to 33 and the frequency counters 35 and 36, and the gain is instructed by the gain instruction signal which is D/A converted by the D/A converter 34. Instead of the signal indicative of the on/off state of the ignition key, a digital signal which indicates the number of revolutions of the engine and which is converted by the frequency counter 36 is used in order to determine the condition of the engine. The other operations are the same as those of the electric power steering apparatus of Embodiment 1, and hence their description is omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising:
    a motor for assisting a steering force;
    a motor driving circuit for driving said motor;
    first and second torque sensors for detecting a steering torque;
    a first control unit constructed only by hardware and including:
        a first motor current target value determining unit which is connected to said first torque sensor and which determines a first motor current target value having upper and lower limits of a driving current of said motor as a target value for automatic control;
        a detecting circuit for detecting a driving current of said motor driving circuit; and
        a circuit for outputting a signal to control said motor driving circuit on the basis of said detected driving current and said first motor current target value; and
    a second control.unit including:
        a second motor current target value determining unit which is connected to said second torque sensor and which determines a second motor current target value which is independent of said first motor current target value; and
        a judging unit for generating a signal to change said first motor current target value on the basis of said first motor current target value, said second motor current target value, said driving current, and a signal indicative of a condition of a vehicle, with output of said generated signal to said first control unit.

2. An electric power steering apparatus according to claim 1, wherein
    said first control unit includes a gain variable circuit for changing a gain of said first motor current target value, and
    said judging unit generates a gain instruction signal to instruct a gain of said gain variable circuit.

3. An electric power steering apparatus according to claim 2, wherein
    said second control unit includes a gain variable unit for changing a gain of said second motor current target value, and
    said judging unit generates a gain instruction signal to instruct a gain of said gain variable unit.

4. An electric power steering apparatus according to claim 1, wherein
    said first control unit includes a limit-value changing circuit for limiting an output of a gain variable circuit, and
    said judging unit outputs an upper-and-lower limit value limiting signal to instruct a limit value of said limit-value changing circuit.

5. An electric power steering apparatus according to claim 2, wherein
    said first control unit includes a limit-value changing circuit for limiting an output of said gain variable circuit, and
    said judging unit outputs an upper-and-lower-limit value limiting signal to instruct a limit value of said limit-value changing circuit.

6. An electric power steering apparatus according to claim 3, wherein
    said first control unit includes a limit-value changing circuit for limiting an output of said gain variable circuit, and
    said judging unit outputs an upper-and-lower limit value limiting signal to instruct a limit value of said limit-value changing circuit.

7. An electric power steering apparatus according to claim 1, wherein
    said judging unit judges that, when a difference between said first motor current target value and said second motor current target value is larger than a predetermined value, there is an abnormality, whereby said first and second motor current target values are limited.

8. An electric power steering apparatus according to claim 2, wherein
    said judging unit judges that, when a difference between said first motor current target value and said second motor current target value is larger than a predetermined value, there is an abnormality, whereby said first and second motor current target values are limited.

9. An electric power steering apparatus according to claim 3, wherein
    said judging unit judges that, when a difference between said first motor current target value and said second motor current target value is larger than a predetermined value, there is an abnormality, whereby said first and second motor current target values are limited.

10. An electric power steering apparatus according to claim 4, wherein
    said judging unit judges that, when a difference between said first motor current target value and said second motor current target value is larger than a predetermined value, there is an abnormality, whereby said first and second motor current target values are limited.

11. An electric power steering apparatus according to claim 5, wherein
    said judging unit judges that, when a difference between said first motor current target value and said second motor current target value is larger than a predetermined value, there is an abnormality, whereby said first and second motor current target values are limited.

12. An electric power steering apparatus according to claim 6, wherein
    said judging unit judges that, when a difference between said first motor current target value and said second motor current target value is larger than a predetermined value, there is an abnormality, whereby said first and second motor current target values are limited.

* * * * *